United States Patent
Vaarkamp et al.

(10) Patent No.: US 7,959,792 B2
(45) Date of Patent: Jun. 14, 2011

(54) CO OXIDATION PROMOTERS FOR USE IN FCC PROCESSES

(75) Inventors: Marius Vaarkamp, Burlington, NJ (US); David Matheson Stockwell, Westfield, NJ (US)

(73) Assignee: BASF Corporation, Florham Park, NJ (US)

(*) Notice: Subject to any disclaimer, the term of this patent is extended or adjusted under 35 U.S.C. 154(b) by 963 days.

(21) Appl. No.: 11/366,651

(22) Filed: Mar. 2, 2006

(65) Prior Publication Data

US 2006/0204420 A1    Sep. 14, 2006

Related U.S. Application Data

(60) Provisional application No. 60/659,821, filed on Mar. 9, 2005.

(51) Int. Cl.
*C01G 11/02* (2006.01)

(52) U.S. Cl. ........ 208/121; 208/113; 502/300; 502/304; 502/326

(58) Field of Classification Search .............. 208/64, 208/70, 106, 112, 113, 119, 120.01, 121, 208/123; 423/400, 594.15, 628; 502/20, 502/103, 300, 303, 304, 325, 328; 518/701
See application file for complete search history.

(56) References Cited

U.S. PATENT DOCUMENTS

| | | | |
|---|---|---|---|
| 4,072,600 A | 2/1978 | Schwartz | |
| 4,088,568 A | 5/1978 | Schwartz | |
| 4,107,032 A | 8/1978 | Chester | |
| 4,171,286 A | 10/1979 | Dight et al. | |
| 4,199,435 A | 4/1980 | Chessmore et al. | |
| 4,222,856 A | 9/1980 | Hansel et al. | |
| 4,290,878 A | 9/1981 | Blanton, Jr. | |
| 4,300,997 A * | 11/1981 | Meguerian et al. | 208/120.1 |
| 4,311,581 A * | 1/1982 | Baron et al. | 208/115 |
| 4,350,614 A | 9/1982 | Schwartz | |
| 4,544,645 A | 10/1985 | Klaassen et al. | |
| 4,608,357 A | 8/1986 | Silverman et al. | |
| 5,085,762 A * | 2/1992 | Absil et al. | 208/120.15 |
| 5,110,780 A | 5/1992 | Peters | |
| 5,164,072 A | 11/1992 | Peters | |
| 5,286,370 A * | 2/1994 | Chu et al. | 208/120.25 |
| 5,565,399 A | 10/1996 | Fraenkel et al. | 502/304 |

(Continued)

FOREIGN PATENT DOCUMENTS

JP    2004283775 A *    10/2004

OTHER PUBLICATIONS

Papageorgiou, et al., "Preparation of Pt/y-Al2O3 Pellets With Internal Step-Distribution of Catalyst: Experiments and Theory", Journal of Catalysis 158, 439-451, 1996, Article No. 0045.

(Continued)

*Primary Examiner* — Stanley Silverman
*Assistant Examiner* — Richard M Rump
(74) *Attorney, Agent, or Firm* — Raymond F. Keller

(57) ABSTRACT

A composition for promoting the oxidation of CO and minimizing NOx emissions during FCC processes comprises (i) acidic oxide support, (ii) at least one precious metal for promoting CO oxidation, and (iii) metals or metal oxides capable of reducing NOx production during CO oxidation, at least one precious metal (ii) being primarily distributed in the central interior of particulate additive and the metals or metal oxides (iii) being primarily distributed in the particulate additive as a shell around the precious metal.

20 Claims, 1 Drawing Sheet

U.S. PATENT DOCUMENTS

| | | | |
|---|---|---|---|
| 6,107,240 A * | 8/2000 | Wu et al. | 502/304 |
| 6,117,813 A | 9/2000 | McCauley et al. | |
| 6,129,834 A * | 10/2000 | Peters et al. | 208/120.01 |
| 6,165,933 A | 12/2000 | Peters | |
| 6,214,307 B1 * | 4/2001 | Okumura et al. | 423/213.5 |
| 6,358,881 B1 | 3/2002 | Peters | |
| 2004/0072675 A1 * | 4/2004 | Kelkar et al. | 502/63 |
| 2004/0074811 A1 * | 4/2004 | Yaluris et al. | 208/113 |
| 2004/0209770 A1 * | 10/2004 | Nakatsuji | 502/302 |

OTHER PUBLICATIONS

R.A. Van Santen, et al., "Catalysis: An Integrated Approach", Second, revised and enlarged edition, Netherlands Institute for Catalysis Research, 1999.

Lekhal, et al., "Predicting the Effect of Drying on Supported Coimpregnation Catalysts", Ind. Eng. Chem. Res. 2001, 40, 3989-3999.

* cited by examiner

CO OXIDATION PROMOTERS FOR USE IN FCC PROCESSES

CROSS REFERENCE TO RELATED APPLICATIONS

This application claims the benefit of U.S. Provisional Patent Application Ser. No. 60/659,821 filed on Mar. 9, 2005, the entirety of which is incorporated herein by reference.

FIELD OF THE INVENTION

This invention is directed to an improved catalyst additive for oxidation of CO without increased NOx production during FCC processing.

BACKGROUND OF THE INVENTION

A major industrial problem involves the development of efficient methods for reducing the concentration of air pollutants, such as carbon monoxide, sulfur oxides and nitrogen oxides in waste gas streams which result from the processing and combustion of sulfur, carbon and nitrogen containing fuels. The discharge of these waste gas streams into the atmosphere is environmentally undesirable at the sulfur oxide, carbon monoxide and nitrogen oxide concentrations that are frequently encountered in conventional operations. The regeneration of cracking catalyst, which has been deactivated by coke deposits in the catalytic cracking of sulfur and nitrogen containing hydrocarbon feedstocks, is a typical example of a process which can result in a waste gas stream containing relatively high levels of carbon monoxide, sulfur and nitrogen oxides.

Catalytic cracking of heavy petroleum fractions is one of the major refining operations employed in the conversion of crude petroleum oils to useful products such as the fuels utilized by internal combustion engines. In fluidized catalytic cracking (FCC) processes, high molecular weight hydrocarbon liquids and vapors are contacted with hot, finely-divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

In the catalytic cracking of hydrocarbons, some nonvolatile carbonaceous material or coke is deposited on the catalyst particles. Coke comprises highly condensed aromatic hydrocarbons and generally contains from about 4 to about 10 weight percent hydrogen. When the hydrocarbon feedstock contains organic sulfur and nitrogen compounds, the coke also contains sulfur and nitrogen. As coke accumulates on the cracking catalyst, the activity of the catalyst for cracking and the selectivity of the catalyst for producing gasoline blending stocks diminishes. Catalyst which has become substantially deactivated through the deposit of coke is continuously withdrawn from the reaction zone. This deactivated catalyst is conveyed to a stripping zone where volatile deposits are removed with an inert gas at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from the catalyst surfaces with an oxygen containing gas such as air. The combustion of these coke deposits can be regarded, in a simplified manner, as the oxidation of carbon and the products are carbon monoxide and carbon dioxide.

High residual concentrations of carbon monoxide in flue gases from regenerators have been a problem since the inception of catalytic cracking processes. The evolution of FCC has resulted in the use of increasingly high temperatures in FCC regenerators in order to achieve the required low carbon levels in the regenerated catalysts. Typically, present day regenerators now operate at temperatures in the range of about 1100° F. to 1400° F. when no promoter is used and result in flue gases having a $CO_2/CO$ ratio in the range of 36 or higher, in a full burn unit to 0.5. The oxidation of carbon monoxide is highly exothermic and can result in so-called "carbon monoxide afterburning" which can take place in the dilute catalyst phase, in the cyclones or in the flue gas lines. Afterburning has caused significant damage to plant equipment. On the other hand, unburned carbon monoxide in atmosphere-vented flue gases represents a loss of fuel value and is ecologically undesirable.

Restrictions on the amount of carbon monoxide, which can be exhausted into the atmosphere and the process advantages resulting from more complete oxidation of carbon monoxide, have stimulated several approaches to the provision of means for achieving complete combustion of carbon monoxide in the regenerator.

Among the procedures suggested for use in obtaining complete carbon monoxide combustion in an FCC regeneration have been: (1) increasing the amount of oxygen introduced into the regenerator relative to standard regeneration; and either (2) increasing the average operating temperature in the regenerator or (3) including various carbon monoxide oxidation promoters in the cracking catalyst to promote carbon monoxide burning. Various solutions have also been suggested for the problem of afterburning of carbon monoxide, such as addition of extraneous combustibles or use of water or heat-accepting solids to absorb the heat of combustion of carbon monoxide.

Specific examples of treatments applied to regeneration operated in the complete combustion mode include the addition of a CO combustion promoter metal to the catalyst or to the regenerator. For example, U.S. Pat. No. 2,647,860 proposed adding 0.1 to 1 weight percent chromic oxide to a cracking catalyst to promote combustion of CO. U.S. Pat. No. 3,808,121 taught using relatively large-sized particles containing CO combustion-promoting metal into a regenerator. The small-sized catalyst is cycled between the cracking reactor and the catalyst regenerator while the combustion-promoting particles remain in the regenerator. Also, U.S. Pat. Nos. 4,072,600 and 4,093,535 teach the use of Pt, Pd, Ir, Rh, Os, Ru, and Re in cracking catalysts in concentrations of 0.01 to 50 ppm, based on total catalyst inventory to promote CO combustion in a complete burn unit.

The use of precious metals to catalyze oxidation of carbon monoxide in the regenerators of FCC units has gained broad commercial acceptance. Some of the history of this development is set forth in U.S. Pat. No. 4,171,286 and U.S. Pat. No. 4,222,856. In the earlier stages of the development, the precious metal was deposited on the particles of cracking catalyst. Present practice is generally to supply a promoter in the form of solid fluidizable particles containing a precious metal, such particles being physically separate from the particles of cracking catalyst. The precious metal or compound thereof, is supported on particles of suitable carrier material and the promoter particles are usually introduced into the regenerator separately from the particles of cracking catalyst. The particles of promoter are not removed from the system as fines and are cocirculated with cracking catalyst particles during the cracking/stripping/regeneration cycles. Judgment of the CO combustion efficiency of a promoter is done by the ability to control the difference in temperature, delta T, between the (hotter) dilute phase, cyclones or flue gas line, and the dense phase. Most FCC units now use a Pt CO combustion promoter. While the use of combustion promoters such as platinum reduce CO emissions, such reduction in CO emissions is usually accompanied by an increase in nitrogen oxides (NOx) in the regenerator flue gas.

Promoter products used on a commercial basis in FCC units include calcined spray dried porous microspheres of kaolin clay impregnated with a small amount (e.g., 100 to 1500 ppm) of platinum. Reference is made to U.S. Pat. No. 4,171,286 (supra). Most commercially used promoters are obtained by impregnating a source of platinum on microspheres of high purity porous alumina, typically gamma alumina. The selection of platinum as the precious metal in various commercial products appears to reflect a preference for this metal that is consistent with prior art disclosures that platinum is the most effective group VIII metal for carbon monoxide oxidation promotion in FCC regenerators. See, for example, FIG. 3 in U.S. Pat. No. 4,107,032 and the same figure in U.S. Pat. No. 4,350,614. The figure illustrates the effect of increasing the concentration of various species of precious metal promoters from 0.5 to 10 ppm on $CO_2/CO$ ratio.

U.S. Pat. No. 4,608,357 teaches that palladium is unusually effective in promoting the oxidation of carbon monoxide to carbon dioxide under conditions such as those that prevail in the regenerators of FCC units when the palladium is supported on particles of a specific form of silica-alumina, namely leached mullite. The palladium may be the sole catalytically active metal component of the promoter or it may be mixed with other metals such as platinum.

U.S. Pat. Nos. 5,164,072 and 5,110,780, relate to an FCC CO promoter having Pt on La-stabilized alumina, preferably about 4-8 weight percent $La_2O_3$. It is disclosed that ceria "must be excluded." At col. 3, it is disclosed that "In the presence of an adequate amount of $La_2O_3$, say about 6-8 percent, 2 percent Ce is useless. It is actually harmful if the $La_2O_3$ is less." In an illustrative example '072 and '780 demonstrates an adverse effect of 8% Ce on CO promotion of platinum supported on a gamma alumina and a positive effect of La.

When sulfur and nitrogen containing feedstocks are utilized in catalytic cracking process, the coke deposited on the catalyst contains sulfur and nitrogen. During regeneration of coked deactivated catalyst, the coke is burned from the catalyst surface that then results in the conversion of a portion of the sulfur and nitrogen to sulfur oxides and nitrogen oxides, respectively.

Unfortunately, the more active combustion promoters such as platinum and palladium also serve to promote the formation of nitrogen oxides in the regeneration zone. It has been reported that the use of prior art CO promoters can cause a dramatic increase (e.g. >300%) in NOx. It is difficult in a catalyst regenerator to completely burn coke and CO without increasing the NOx content of the regenerator flue gas. Since the discharge of nitrogen oxides into the atmosphere is environmentally undesirable, the use of these promoters has the effect of substituting one undesirable emission for another. Many jurisdictions restrict the amount of NOx that can be in a flue gas stream discharged to the atmosphere. In response to environmental concerns, much effort has been spent on finding ways to reduce NOx emissions.

Various approaches have been used to either reduce the formation of NOx or treat them after they are formed. Most typically, additives have been used either as an integral part of the FCC catalyst particles or as separate particles in admixture with the FCC catalyst.

Various additives have been developed that will carry out CO promotion while controlling NOx emissions.

U.S. Pat. Nos. 4,350,614, 4,072,600 and 4,088,568 mention rare earth addition to Pt based CO promoters. An example is 4% REO that shows some advantage. There is no teaching of any effect of REO on decreasing NOx emissions from the FCCU.

U.S. Pat. No. 4,199,435 teaches a combustion promoter selected from the Pt, Pd, Ir, Os, Ru, Rh, Re and copper on an inorganic support.

U.S. Pat. No. 4,290,878 teaches a Pt—Ir and Pt—Rh bimetallic promoter that reduces NOx compared to conventional Pt promoter.

U.S. Pat. No. 4,300,997 teaches the use of a Pd—Ru promoter for oxidation of CO that does not cause excessive NOx formation.

U.S. Pat. No. 4,544,645 describes a bimetallic of Pd with every other Group VIII metal but Ru.

U.S. Pat. Nos. 6,165,933 and 6,358,881 to W. R. Grace describe compositions comprising a component containing (i) an acidic oxide support, (ii) an alkali metal and/or alkaline earth metal or mixtures thereof, (iii) a transition metal oxide having oxygen storage capability, and (iv) palladium; to promote CO combustion in FCC processes while minimizing the formation of NOx.

U.S. Pat. No. 6,117,813 teaches a CO promoter consisting of a Group VIII transition metal oxide, Group IIIB transition metal oxide and Group IIA metal oxide.

There is still a need, however, for improved CO oxidation promoters having NOx emission control in FCC processes.

SUMMARY OF THE INVENTION

The invention provides novel compositions suitable for use in FCC processes that are capable of providing improved CO oxidation promotion activity along with NOx emission control.

In one aspect, the invention provides compositions for promoting CO oxidation in FCC processes, the compositions containing (i) an acidic oxide support, (ii) ceria (iii) at least one oxide of a lanthanide series element other than ceria, (iv), optionally, at least one oxide of a transition metal selected from Groups Ib and IIb of the Periodic Table and (v) at least one precious metal. The acidic oxide support preferably contains alumina. Praseodymium oxide is the preferred lanthanide oxide other than ceria. Cu and Ag are preferred Group Ib transition metals and Zn is the preferred Group IIb transition metal.

In another aspect, the invention encompasses FCC processes using the CO oxidation promotion compositions of this invention either as an integral part of the FCC catalyst particles or as separate particles admixed with the FCC catalyst. The composition provides lower NOx emissions than prior art CO oxidation promoters.

In still another aspect of this invention, an additive for CO oxidation is provided by incorporating into a single particle, a platinum group metal for CO oxidation promotion and metal components for NOx decomposition, and in which the platinum group metal and other metals are distributed in separate areas of the particle to achieve improvements in NOx reduction.

These and other aspects of the invention are described in further detail below.

DETAILED DESCRIPTION OF THE INVENTION

Figure 1:
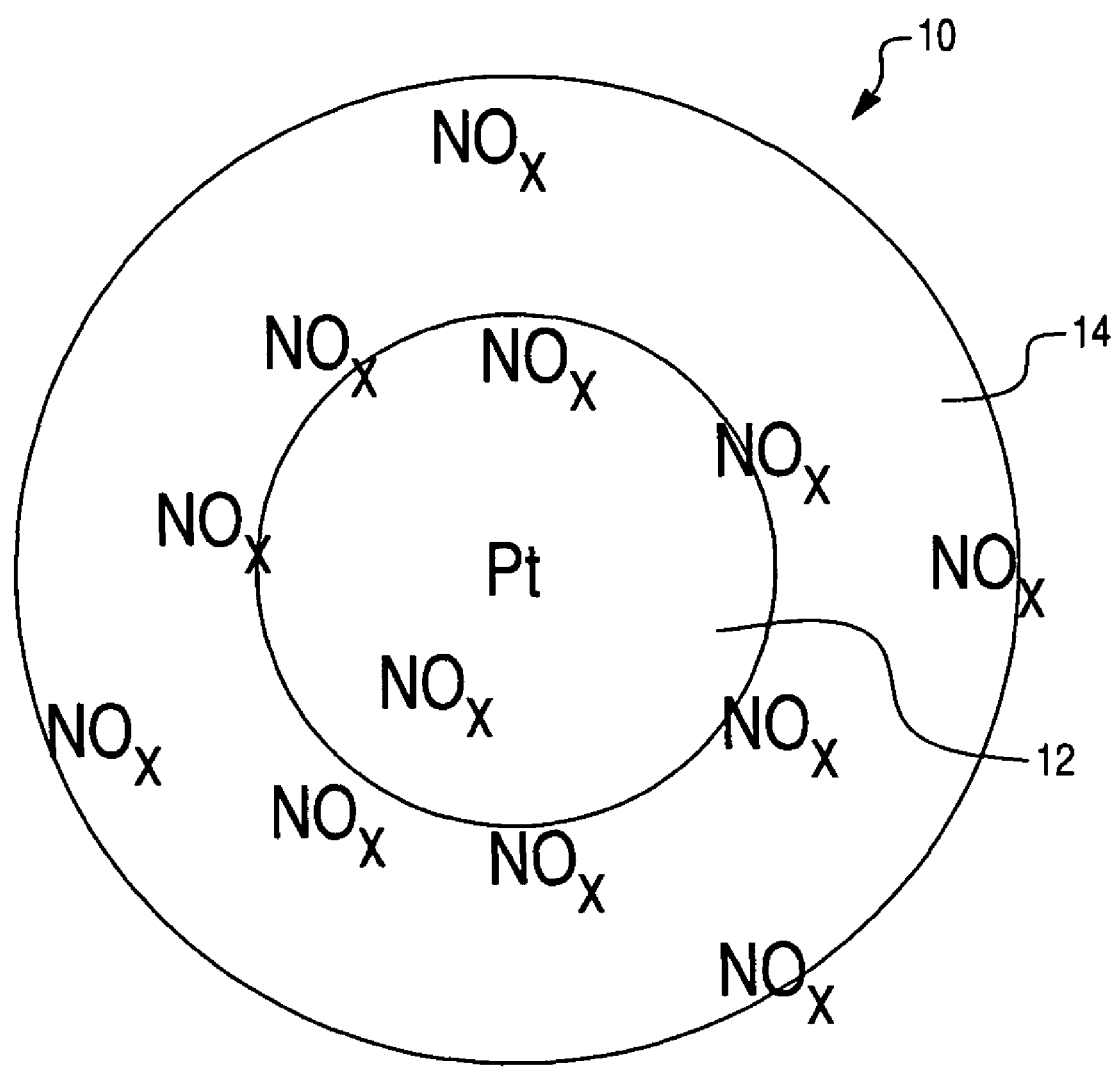
FIG. 1 is a graphic description of an additive of this invention illustrating the distribution of CO oxidation promoter and NOx decomposition components.

In one aspect, the invention encompasses the discovery that certain classes of compositions are very effective for both the oxidation of CO and reduction of NOx gas emissions in FCC processes. The CO oxidation compositions of the inventions are characterized in that they comprise (i) an acidic oxide support, (ii) cerium oxide (iii) at least one oxide of a lanthanide series element other than ceria, (iv), optionally, at least one oxide of a transition metal selected from Groups Ib and IIb of the Periodic Table and mixtures thereof and (v) at least one precious metal.

The acidic oxide support should be of sufficient acidity for the composition to act as an effective additive for CO oxidation promotion. Acidic oxide catalyst supports are well know to those of ordinary skill in the art and include, for example, transitional aluminas such as gamma and eta alumina, silica-stabilized versions of said aluminas, including the silica-stabilized alumina spinel formed by leaching silica from kaolin calcined through its characteristic exotherm to form the spinel, or mullite. The support may be crystalline or amorphous. Preferably, the acidic oxide support contains at least some alumina. More preferably, the oxide support contains at least 50 wt. % alumina. The oxide support is preferably an oxide selected from the group consisting of alumina and silica-alumina. Where an amorphous silica-alumina support is used, the support preferably has an alumina to silica molar ratio of from about 1:1 up to about 50:1. Examples of commercially available acidic oxide alumina supports are available under tradenames such as PURALOX, CATAPAL and VERSAL. Examples of commercially available acidic silica-alumina supports are available under the tradenames such as SIRAL and SIRALOX.

The silica-alumina support can optionally be created by the caustic leaching of silica from preformed kaolin microspheres as described in U.S. Pat. Nos. 4,847,225 and 4,628,042, which are hereby incorporated by reference for their teachings in this regard. Preferably, the kaolin that is subject to caustic leaching is calcined substantially through its characteristic exotherm to form spinel and/or mullite. More preferably, the caustic leached kaolin support is a microsphere whereby the caustic leached kaolin is bound with aluminum chlorohydroxide before calcination through the exotherm.

The acidic oxide support further preferably has sufficient surface area to facilitate CO oxidation promotion and control. Preferably, the oxide support has a surface area of at least about 20 m$^2$/g, more preferably from about 50 up to about 300 m$^2$/g. The acidic oxide support may be a powder which is preferable when used as an integral part of the FCC catalyst or a microsphere or particle, preferably when used as an admixture with FCC catalysts.

The amount of the cerium oxide (ceria) present in the additive composition of the present invention may be varied considerably relative to the amount of acidic oxide support. Preferably, the additive composition contains at least about 0.5 part by weight of cerium oxide per 100 parts by weight of the acidic oxide support material, more preferably from at least about 1 part by weight up to about 25 parts by weight of cerium oxide per 100 parts of the acidic oxide support material.

The lanthanide oxides other than ceria include at least one metal oxide from the lanthanide series other than ceria. Preferably, the lanthanide oxide other than ceria is praseodymium oxide. The amount of the lanthanide oxide other than ceria present in the additive composition may be varied considerably relative to the amount of acidic oxide support. Preferably, the additive composition contains a lower amount of the lanthanide oxide other than ceria relative to the ceria present in the composition. In general, the amount of ceria to the lanthanide oxides other than ceria present in the additive composition of this invention ranges from 5:1 to 20:1 by weight, preferably 5:1 to 10:1.

The Group Ib and/or IIb transition metals may be any metal or combination of metals selected from those groups of the Periodic Table. Preferably, the transition metal is selected from the group consisting of Cu, Ag, Zn and mixtures thereof. The amount of transition metal present is preferably at least about 100 parts by weight (measured as metal oxide) per million parts of the oxide support material, more preferably from about 0.1 up to about 5 parts by weight per 100 parts of the oxide support material.

The amount of precious metal can be varied considerably depending the level of CO combustion promotion desired. Typical levels of precious metal will be in the range of 50 to 1500 ppm of total additive and/or catalyst. As used herein the precious metals include those selected from a group consisting of Pt, Pd, Ir, Os, Ru, Rh, Re and their precursors such as salts and amine complexes and mixtures thereof, preferably the precious metal is Pt, Pd or mixtures thereof.

The additive composition may contain minor amounts of other materials, which preferably do not adversely affect the CO oxidation or NOx control function in a significant way. Reference herein to NOx control typically refers to the reduction of NOx emissions from the FCC process, although other types of control are contemplated by this invention including, for example, the maintenance of the NOx emission levels in the FCC unit where increased emissions of NOx are expected. The additive composition may consist essentially of items (i)-(v) mentioned above, item (iv) being optional. Where the composition of the invention is used as an additive particle for an FCC process (as opposed to being integrated into the FCC catalyst particles themselves), the additive composition may be combined with fillers (e.g. clay, silica-alumina, silica and/or alumina particles) and/or binders (e.g. silica sol, alumina sol, silica alumina sol, etc.) to form particles suitable for use in an FCC process, preferably by spray drying before the calcination of step. More preferably, porous particles, also known as microspheres, are formed from acidic oxide support typically by spray drying powdered oxide support material combined with a binder/filler before or after impregnation with the individual constituents. Preferably, any added binders or fillers used do not significantly adversely affect the performance of the additive component.

Where the additive composition is used as an additive particulate (as opposed to being integrated into the FCC catalyst particles themselves), the amount of additive component in the additive particles is preferably at least 50 wt. %, more preferably at least 75 wt. %. Most preferably, the additive particles consist entirely of the additive component. The additive particles are preferably of a size suitable for circulation with the catalyst inventory in an FCC process. The additive particles preferably have an average particle size of about 20-200 m. The additive particles preferably have attrition characteristics such that they can withstand the sever environment of an FCCU (fluid catalytic cracking unit).

As previously mentioned the additive composition of the invention may be integrated into the FCC catalyst particles themselves. In such case, any conventional FCC catalyst particle components may be used in combination with the additive composition of the invention. If integrated into the FCC catalyst particles the additive composition of the invention preferably represents at least about 0.02 wt. % the FCC catalyst particle.

While the invention is not limited to any particular method of manufacture, the additive composition of the invention can be made by the following procedures:

(a) co-impregnate the acidic oxide support particles with a cerium oxide source, at least one lanthanide oxide source other than ceria, and, optionally, at least one source of a Group 1b/IIb element.
(b) calcine the impregnated support of step (a)
(c) impregnate the formed material in step (b) with the desired level and choice of precious metal or precursor salt or complex,
(d) optionally, recalcine the impregnated additive from step (c).

The sources of oxides are preferably slurries, sols and/or solutions of the metal oxides themselves or salts of the respective metals, which decompose to oxides on calcination, or combinations of oxides and salts. If desired, the individual constituents may be separately added to the support particles with a calcination step in between each addition. The calcination steps are preferably performed at about 450-750° C.

The additive composition may be used as a separate additive particle or as an integral part of an FCC catalyst particle. If used as an additive, the additive component may itself be formed into particles suitable for use in a FCC process. Alternatively, the additive component may be combined with binders, fillers, etc. by any conventional technique. See for example, the process described in U.S. Pat. No. 5,194,413, the disclosure of which is incorporated herein by reference.

Where the additive component of the invention is integrated into an FCC catalyst particle, preferably the component is first formed and then combined with the other constituents which make up the FCC catalyst particle. Incorporation of the additive composition directly into FCC catalyst particles may be accomplished by any known technique. Examples of suitable techniques for this purpose are disclosed in U.S. Pat. Nos. 3,957,689; 4,499,197; 4,542,188 and 4,458,623, the disclosures of which are incorporated herein by reference.

The compositions of this invention will not typically contain alkali and/or alkaline earth metals. The absence of the amount of alkali and/or alkaline earth metals shall mean less than about 1%, preferably, less than about 0.5% and, more preferably, less than about 0.1% alkali and alkaline earth metal present in the additive compositions of this invention. In another aspect of this invention, alkali and/or alkaline earth metals may be present in the additive composition of this invention so long as such metals are properly distributed in the additive particle, as will be further explained below.

The compositions of the invention may be used in any conventional FCC process. Typical FCC processes are conducted at reaction temperatures of 450 to 650° C. with catalyst regeneration temperatures of 600 to 850° C. The compositions of the invention may be used in FCC processing of any typical hydrocarbon feedstocks. Preferably, the compositions of the invention are used in FCC processes involving the cracking of hydrocarbon feedstocks which contain above average amounts of nitrogen, especially residual feedstocks or feedstocks having a nitrogen content of at least 0.1 wt. %. The amount of the additive component of the invention used may vary depending on the specific FCC process. Preferably, the amount of additive component used (in the circulating inventory) is about 0.05-15 wt. % based on the weight of the FCC catalyst in the circulating catalyst inventory. The presence of the compositions of the invention during the FCC process catalyst regeneration step effectively promotes the oxidation of CO while minimizing the ultimate level of NOx production as well.

In another aspect of the present invention, a particulate additive for incorporation into an FCC process is described as having a specified distribution of precious metal so as to be effective in promoting the oxidation of carbon monoxide while minimizing NOx production. The additive of this aspect of the present invention is based on the concept of distributing the precious metal CO oxidation promoter within the center of the particulate additive and distributing throughout the particle any metal or metal oxides which have been found useful in the decomposition of NOx. A graphic depiction of the additive of this invention is shown in FIG. 1. As depicted in FIG. 1, the porous, particulate additive 10 will include a precious metal designated "Pt" such as previously described, which is primarily distributed in the center 12 of additive 10. What is theorized in accordance with this invention is that the precious metal such as Pt, Pd, Ir, Os, Ru, Rh, and/or Re distributed primarily in the central area 12 of the porous additive 10 will be able to promote the oxidation of CO to $CO_2$. However, as previously stated, not only do the above platinum group metals promote the oxidation of CO to $CO_2$, but a substantial amount of NOx is typically formed. In accordance with this invention, surrounding the core distribution 12 of the precious metal and even distributed through the core distribution 12 are metal or metal oxides designated "NOx" which are known to work in tandem with the precious metal to decompose NOx. Depicted in FIG. 1 is a shell 14 which can contain a large proportion of these other metal or metal oxides for decomposing NOx.

For example, shell distribution 14 and even core distribution 12 can include ceria and a lanthanide metal oxide other than ceria as described above, such as praseodymium oxide, or other rare earth oxides. Also incorporated throughout particle 10, including the shell distribution 14, could be at least one oxide of transition metals selected from groups Ib and IIb of the Periodic Table, as also described previously. The NOx decomposition components may alternatively comprise alkaline metals or alkaline earth metals and transition metal oxides as described in the W. R. Grace patents mentioned previously. Aforementioned U.S. Pat. Nos. 6,165,933 and 6,358,881 are herein incorporated by reference in their entirety. Additionally, precious metals other than the precious metal contained in the core distribution 12 may be incorporated throughout particle 10. Thus, it is known in the prior art, including patents mentioned previously, that bimetallic precious metal CO oxidation promoters can also decompose NOx. Referring again to FIG. 1, it is believed that any NOx components formed by the precious metal in additive 10 will now be directed toward the outer surfaces of the particle, and would be trapped or otherwise decomposed to nitrogen such as in the shell distribution 14 containing the metal or metal oxide components, which are known to work in tandem with precious metals to decompose NOx. It is believed that the distribution as depicted in FIG. 1 minimizes the production of NOx during promotion of CO oxidation by precious metals. It is to be understood that a fine separation between precious metal in core distribution 12 and other metals or metal oxides in shell distribution 14 may not exist. It is likely and preferred that there be some overlap between the NOx decomposition components and core 12. In general, however, the primary distribution of precious metal will be in the far interior of the porous particulate substrate whereas the other metals or metal oxides will be primarily distributed near the outer surface of the particle.

To achieve the desired distribution of metal catalytic components as in the additive of this invention as depicted in FIG. 1, any known method can be used by this invention. In one such method, the porous substrate can first be impregnated with the precious metal. Upon impregnation and calcination to activate the metal, the support can then be coated with additional oxide which can then be impregnated with the NOx-decomposing metals. The NOx-decomposing metals may be alternatively mixed or impregnated into the coating composition. This process is described in U.S. Pat. No. 5,935,889, the entire content of which is herein incorporated by reference. In this method, a core distribution of the precious metal is subsequently coated with one or more incremental shell layers which can contain one or more of the NOx-decomposing metals that now surround the core precious metal distribution. The shell layers can be formed by a deposition process which uses a fluidized bed coating technique which involves repeatedly applying and drying small quantities of a slurry containing the shell material wherein the slurry is in the form of a colloidal dispersion, or sol or very fine particles.

It is also known to form an "egg yolk" catalyst distribution in which a catalyst component, in this case, precious metal, is concentrated at the particle center. Such process involves impregnating the particle with a precious metal solution or complex, alone or with a co-impregnant. It is known that convective flow of the liquids through the particle can be affected by specific drying models that can effectively distribute a metal into the desired interior of a prous particle. Subsequent impregnation can distribute one or more additional metals upon the outer surfaces of the porous support. The effect of different drying processes on catalyst distribution is described in "Predicting the Effect of Drying on Supported Coimpregnation Catalysts," Lekhal et al., Ind. Eng. Chem. Res. 2001, 40, pgs. 3989-3999. This article is also incorporated in its entirety by reference herein.

Internal distribution of a platinum group metal is also known by impregnating a porous support such as alumina with a platinum group salt and an acid that competes with the platinum salt for adsorption within the porous support. For example, a high surface area porous support can be contacted with a liquid solution of the active component. The active component enters the porous support via capillary action and diffusion and absorbs on the available surface sites. When alumina supports are impregnated solely with hexachloroplatinic acid, it has been found that the resulting catalyst profile is typically of the "eggshell" type, that being the platinum is located in a thin shell at the support surface. It has been known that the platinum distribution could be made more uniform or distributed in the center of a catalyst by co-impregnating the hexachloroplatinic acid with an acid such as HCl or citric acid wherein the platinum is now in a sub-surface band or within the core of the porous support. Other co-impregnants have been studied in order to change the distribution of the platinum component. Depending on the relative diffusion and adsorption strengths of the co-impregnants, the active component can be "pushed" into the interior of the particle. A review of this type of process is described in "Preparation of Pt/Gamma-$Al_2O_3$ Pellets with Internal Step-Distribution of Catalyst: Experiments and Theory," Papageorgiou, et al., Journal of Catalysis 158, 1996, pgs 439-451, and "Catalysis: An Integrated Approach, Second, revised and enlarged edition," Netherlands Institute for Catalysis Research, 1999, Chapter 10, the entire contents of which are herein incorporated by reference.

The following examples are illustrative of embodiments of the invention and are not intended to limit the invention as encompassed by the claims forming part of the application.

Example 1

2% $Pr_6O_{11}$/10% $CeO_2$/2% CuO/Alumina

Alumina support particles are coimpregnated with a solution of cerium and praseodymium nitrate by incipient wetness, dried and calcined at 1200° F. for 2 hours to achieve a 10% $CeO_2$ and 2 wt % $Pr_6O_{11}$ level. On the microsphere, copper nitrate is impregnated, dried and calcined at 1200° F. for 2 hours to achieve a 2 wt % CuO level.

Example 2

3% $Pr_6O_{11}$/18% $CeO_2$/0.5% CuO/Alumina

Alumina support particles are coimpregnated with a solution of cerium and praseodymium nitrate by incipient wetness, dried and calcined at 1200° F. for 2 hours to achieve a 18% $CeO_2$ and 3 wt % $Pr_6O_{11}$ level. To achieve these levels of Ce and Pr the impregnation and calcination steps were conducted twice. On the resulting microsphere, copper nitrate is impregnated, dried and calcined at 1200° F. for 2 hours to achieve a 0.5 wt % CuO level.

Example 3

2% $Pr_6O_{11}$/10% $CeO_2$/Alumina

Alumina support particles are coimpregnated with a solution of cerium and praseodymium nitrate by incipient wetness, dried and calcined at 1200° F. for 2 hours to achieve a 10% $CeO_2$ and 2 wt % $Pr_6O_{11}$ level.

Example 4

Platinum is impregnated on the product made in Example 1 to a level of 500 ppm from a water solution of monoethanol amine complex. The dried material is calcined at 1200° F. for 2 h.

Example 5

Platinum is impregnated on product made in Example 2 to a level of 500 ppm from a water solution of monoethanol amine complex. The dried material is calcined at 1200° F. for 2 h.

Example 6

Platinum is impregnated on product made in Example 2 to a level of 200 ppm from a water solution of monoethanol amine complex. The dried material is calcined at 1200° F. for 2 h.

Example 7

Platinum is impregnated on product made in Example 3 to a level of 500 ppm from a water solution of monoethanol amine complex. The dried material is calcined at 1200° F. for 2 h.

Example 8

Palladium is impregnated on product made in Example 2 to a level of 500 ppm from a water solution of nitrate salt. The dried material is calcined at 1200° F. for 2 h.

Example 9

Palladium is impregnated on product made in Example 3 to a level of 500 ppm from a water solution of nitrate salt. The dried material is calcined at 1200° F. for 2 h.

COMPARATIVE EXAMPLES

Example A

500 ppm Pt on Alumina

Platinum is impregnated on alumina microspheres to a level of 500 ppm from a water solution of ethanol amine salt. The dried material is calcined at 1200° F. for 2 h.

Example B

500 ppm Pd on Alumina

Palladium is impregnated on alumina microspheres to a level of 500 ppm from a water solution of nitrate salt. The dried material is calcined at 1200° F. for 2 h.

CO Oxidation Testing

The additives tested are deactivated by steaming a 50/50 blend of additive with FCC catalyst at 1500° F. for 4 hours in 100% steam. Chemical markers are used to ensure that the blend composition is retained after steaming. CO oxidation testing is done in a fluid bed with a gas stream that has 5% $CO/3\% O_2/5\% CO_2$/balance $N_2$ at 1100° F. Different CO conversions are achieved by varying the additive charged to the fluid bed reactor. Activity is defined as the slope of $-\ln(1-x)$ vs. space time where x is the conversion of CO. Data from the CO oxidation activity testing is shown in Table 1.

TABLE 1

|  | Activity |
| --- | --- |
| Example 5 | 59 |
| Comparative Example A | 55 |

Results from Table 1 show that additive compositions from the present invention having comparable precious metal loadings have better CO promotion activity than prior art materials.

NOx Reduction

A fixed fluid bed laboratory reactor is used. The additives are deactivated by steaming at 1500° F. for 4 hours in 100% steam. A blend containing 0.2 wt % of the additive with a low metal ECAT is used for testing. Coke is deposited on the blend by cracking gas oil. The spent catalyst is regenerated at 1300° F. in air. NOx emissions from the resulting flue gas are determined via chemiluminescence. The NOx emissions are reported at constant coke. Typical results for NOx reduction are shown in Table 2.

TABLE 2

|  | NOx reduction (%) |
| --- | --- |
| Comparative Example A | Base |
| Example 5 | 17 |
| Example 6 | 28 |

Results from Table 2 show that additive compositions from the present invention reduce NOx emissions when compared with additives from prior art.

Example 10

An additive as described in Example 1 above is formed. Subsequent to calcination, the particulate additive is impregnated with a mixture of chloroplatinic acid and citric acid. The chloroplatinic acid is provided in amounts so as to provide 300 ppm Pt in the additive. The amount of citric acid is significantly larger and is provided to react with the total surface hydroxyl groups of the particle so as to enhance the diffusion of the chloroplatinic acid to the interior and central region of the particle. Calcination of the dried material is done at 1200° F. for 2 hours to yield a particulate additive that contains a central core distribution of platinum and $Pr_6O_{11}$, $CeO_2$, and CuO primarily distributed around the core distribution.

We claim:

1. An additive particulate composition suitable for promoting the oxidation of CO during catalyst regeneration in a fluid catalytic cracking process, said composition comprising (i) a particulate acidic oxide support, (ii) at least one precious metal for promoting CO oxidation, and (iii) metals or metal oxides capable of decomposing NOx, said at least one precious metal (ii) being primarily distributed in the central interior of said particulate additive and said metals or metal oxides (iii) primarily distributed throughout said particulate additive, including as a shell around said at least one precious metal.

2. The composition of claim 1 wherein said acidic oxide support is selected from the group consisting of alumina and silica-alumina.

3. The composition of claim 1 wherein said metals or metal oxides (iii) comprise cerium oxide and at least one oxide of a lanthanide series element other than cerium oxide.

4. The composition of claim 3 wherein said metals or metal oxides (iii) further include a Group Ib and IIb transition metal selected from the group consisting of copper, silver, zinc and mixtures thereof.

5. The composition of claim 3 wherein said cerium oxide is present in amounts of from at least about 0.5 part by weight per 100 parts by weight of said acidic oxide support.

6. The composition of claim 3 wherein the weight ratio of said cerium oxide and at least one oxide of a lanthanide series element other than cerium oxide is at least 5:1.

7. The composition of claim 6 wherein said at least one oxide of a lanthanide series element other than cerium oxide is praseodymium oxide.

8. The composition of claim 1 wherein the precious metal is at least one of the group consisting of Pt and Pd and the amount of precious metal in said composition is at least about 50 and less than about 1500 ppm.

9. The composition of claim 7 wherein the amount of ceria to praseodymium oxide ranges from about 5:1 to about 20:1 by weight.

10. The composition of claim 1 wherein said metals or metal oxides (iii) comprise alkali and/or alkaline earth metals.

11. A fluid cracking catalyst composition comprising (a) a cracking component suitable for catalyzing the cracking of hydrocarbons, and (b) a particulate additive composition comprising (i) an acidic oxide support (ii) at least one precious metal for promoting CO oxidation, and (iii) metals or metal oxides capable of decomposing NOx, said at least one precious metal (ii) being primarily distributed in the central interior of said particulate additive and said metals or metal oxides (iii) primarily distributed throughout said particulate additive, including as a shell around said at least one precious metal, said additive composition being separate particles from the catalyst component and being present in the cracking catalyst in a sufficient CO emission reducing amount.

12. The cracking catalyst of claim 11 wherein the additive component (b) comprises about 0.05 to 15 wt % of the cracking catalyst composition.

13. The cracking catalyst composition of claim 11 wherein said metals or metal oxides (iii) comprise cerium oxide and at least one oxide of a lanthanide series element other than cerium oxide.

14. The cracking catalyst composition of claim 13 wherein said oxide of a lanthanide series element other than ceria is praseodymium oxide.

15. The cracking catalyst composition of claim 11 wherein the precious metal is at least one of the group consisting of Pt and Pd and the amount of precious metal in said composition is at least about 50 and less than about 1500 ppm.

16. The composition of claim 11 wherein said metals or metal oxides (iii) comprise alkali and/or alkaline earth metals.

17. A method of promoting CO oxidation during fluid catalytic cracking of a hydrocarbon feedstock into lower molecular weight components said method comprising contacting a hydrocarbon feedstock with a cracking catalyst suitable for catalyzing the cracking of hydrocarbons at elevated temperature whereby lower molecular weight hydrocarbon components are formed in the presence of a particulate CO oxidation promotion, wherein said particulate composition comprises (i) an acidic oxide support (ii) at least one precious metal for promoting CO oxidation, and (iii) metals or metal oxides capable of decomposing NOx, said at least one precious metal (ii) being primarily distributed in the central interior of said particulate composition and said metals or metal oxides (iii) primarily distributed throughout said particulate composition, including as a shell around said at least one precious metal, said CO reduction composition being present in an amount sufficient to reduce said CO emissions.

18. The method of claim 17 wherein said cracking catalyst is fluidized during contact with a hydrocarbon feedstock.

19. The method of claim 17 further comprising recovering used cracking catalyst from said contacting step and treating said used catalyst under conditions to regenerate said catalyst.

20. The method of claim 17 wherein said hydrocarbon feedstock contains at least 0.1 wt % nitrogen.

* * * * *